2,869,974

PROCESS FOR SHRINKING POLYACRYLONITRILE TEXTILES WITH SPECIFIC CHEMICAL SHRINKING AGENTS

Benjamin Franklin Adams, Jr., Wilmington, Del., assignor to E. I. du Pont de Nemours and Company, Wilmington, Del., a corporation of Delaware No Drawing. Application March 2, 1955
Serial No. 491,797

5 Claims. (Cl. 8—130.1)

This invention relates to shrinking acrylonitrile polymer yarns and fibers. More particularly, it relates to a non-aqueous shrinking treatment.

In co-pending application of Hare, Serial No. 462,630 filed October 15, 1954 now abandoned, there is disclosed an aqueous process for treating acrylonitrile polymer filaments to produce shrinkage and setting of crimp. The aqueous systems used contain certain organic materials such as ethylene carbonate, nitromethane and gamma-butyrolactone. While this process is satisfactory for most purposes in respect to the shrinking and the crimp setting results that are obtained, there has been a need for stable shrinking media and for a process in which the shrinking that is obtained is reproducible in batch or continuous processes. The aqueous shrinking treatment when applied to batts, for example, has been found to give good felts with as much shrinkage as desired, but reproducibility of the results was not satisfactory.

Therefore, it is an object of this invention to provide an improved process for shrinking acrylonitrile polymers and copolymers, fibers, yarns, filamentary articles, such as fabrics and batts, blends of these acrylonitrile polymer yarns or fibers with other filamentary materials, and also fabrics, batts and similar filamentary articles made from such blends. Blends, of course, include stock blends, ply blends, end-and-end blends and the like. Another object of this invention is to provide an improved process for shrinking such filamentary materials in a reproducible manner. These and other objects will be apparent from the disclosure that follows.

The objects of this invention are accomplished by treating the filamentary materials prepared from acrylonitrile polymers with a non-aqueous medium comprising a solution of a compound selected from the group consisting of ethylene carbonate, propylene carbonate and trimethylene carbonate in a diluent, such as a lower aliphatic glycol. Glycols which may be used include ethylene glycol, propylene glycol and diethylene glycol. The glycols that are used thus are aliphatic polyhydric alcohols having no more than 6 carbon atoms and preferably 2 but no more than 3 hydroxyl groups. The fibers may be prepared from any acrylonitrile polymer containing about 80% to 100% of acrylonitrile polymerized in the polymer molecule. Such polymers may be chosen from the many listed in U. S. Patents 2,404,714, 2,404,727 and 2,486,241. Thus, the polymers contain about 80%–100% acrylonitrile and the copolymers may be derived from the polymerization of acrylonitrile with monoethylenically or diethylenically unsaturated compounds as vinyl acetate, vinyl chloride, vinylidene chloride, methyl vinyl ketone, styrene, vinylpyridines, acrylic acid and methacrylic acid or their derivatives such as their esters, ethylenesulfonates, 1-propenylsulfonates, styrenesulfonates and the like. The copolymers may be comprised of two or three or more copolymerizing compounds.

Thus, the process of this invention involves contacting filamentary material made from acrylonitrile polymers derived from at least 80% by weight of acrylonitrile with a non-aqueous solution of a carbonate in an organic liquid which is not a solvent for the material, thereby shrinking the filamentary material. The organic liquid may have some shrinking ability of itself, but generally under the conditions used this effect is not marked, the liquids being in the main inert toward the filamentary material. The carbonates are the effective shrinking agents in the process of this invention.

The following examples are given to illustrate the invention further without any intention of being limited thereby. Parts and percentages are by weight unless otherwise indicated. Shrinkage figures are obtained by dividing the original area of the filamentary material by its area after shrinkage.

Example I

A batt weighing 3.2 ounces per square yard was prepared from one denier, three-inch staple using a standard garnet and crosser-lapper using such techniques as are disclosed in the applications of Herbert G. Lauterbach, S. N. 312,067 now abandoned and S. N. 427,465, filed September 29, 1952 and May 4, 1954, respectively. The polymer used in making the staple was a copolymer of acrylonitrile (94%) and methyl acrylate (6%); the fibers were drawn 4×. The batt was needle punched on a Hunter Machine Company plate-type needle-loom alternately on each side for a total of 16 passes, during which the batt received approximately 2200 punchings per square inch. This was done using number 15 x 18 x 25 x 3½ regular barb needles which had been etched in 37 percent hydrochloric acid for two 3.5 hour periods. The resulting needled batt weighed about 1.8 ounces per square yard. A sample of this batt was immersed in a 23 percent by weight solution of ethylene carbonate in ethylene glycol at 130° C. Shrinkage took place immediately to the extent of about 6.1× (batt area to felt area), resulting in a felt weighing about 11.0 ounces per square yard. The solution was held at this temperature for about three hours after which a second sample of the same needled batt was immersed in the solution; it shrank about 6.4×.

Similar effective shrinkage resulted when fabric made from polyacrylonitrile was used under the shrinkage conditions given above.

Example II

A batt weighing 1.5 ounces per square yard was prepared from 65 percent by weight of one-denier, three-inch staple which was composed of a copolymer of acrylonitrile (94%) and methyl acrylate (6%), and 35% of 80's wool top. The batt was needle-punched and shrunk as described in Example I. Shrinkage took place immediately to the extent of 5.7×, resulting in a felt weighing about 8.5 ounces per square yard. The solution was held at this temperature for about three hours after which a second sample of the same needled batt was immersed in the solution; it shrank 5.7×.

The shrinkage conditions used in this example could be applied effectively to skeins of filaments made from an acryylonitrile/methyl acrylate/potassium styrenesulfonate copolymer.

The invention may be applied to filamentary materials in a wide variety of forms. That is, fibers, filaments, yarns and tows may be shrunk as well as batts shown in the above example using the conditions therein. Likewise, fabrics woven, knitted or non-woven, may be treated by the process of this invention.

Similarly, materials other than ethylene glycol can be used, for example, using trimethylene glycol in the examples instead of ethylene glycol. The material used with the carbonate shrinking agents are inert, organic, non-aqueous liquids that are solvents for the agents. These materials act as diluents for the shrinking agents, and they have very little if any effect on the filamentary materials under the conditions used in this invention. Included among useful materials are propylene glycol, diethylene glycol, hexamethylene glycol, glycerol, and esters such as ethyl acetate, propyl acetate, dibutyl sebacate and tricresyl phosphate. Of the many compounds that can be used, the glycols are preferred.

An important contribution of this invention resides in the finding that non-aqueous, non-ionic media are superor. In previous work with aqueous systems, rapid hydrolysis of the shrinking agents occurred when the aqueous media were not neutral or if traces of inorganic salts were present. The difficulty of maintaining the aqueous media neutral and ion-free led always to variable results, for it was virually impossible to keep ideal conditions. Shrinking agent was destroyed due to hydrolysis, and concentration changes stemming both from loss in agent and from loss of water by evaporation prevented the attainment of requisite reproducibility. Further, with an aqueous medium the maximum temperature that can be used at atmospheric pressure is 100° C.

These disadvantages are avoided by the process of this invention. In this process, the temperature may range from about 60° C. to the boiling point of the carbonate/inert liquid mixture which may be quite high as, for example, 170° C., even at atmospheric pressures. The time involved is very short, for shrinkage takes place in the effective media of this invention within a few seconds after applying the shrinkage agent to the filamentary material. The method of application will generally be immersion, although techniques, such as spraying, may be used. The solution used may contain up to about 40%, by weight, of the carbonate shrinking agent depending upon the temperature and amount of shrinkage desired. If higher concentrations are used, as, for example, 55% carbonate, lower temperatures will be used to get the same degree of shrinkage using a 40% solution. In general, excellent reproducible results are attained at the 40% level and there is generally no need to use the more concentrated media. Some shrinkage can be obtained using the glycols by themselves, but the temperature-shrinkage relationship is too critical for the process to be feasible. The combination of the very effective carbonates with the lesser effective glycols gives excellent shrinking agents useful in temperature ranges and concentrations leading to a reproducible, commercially feasible process.

Any departure from the above description which conforms to the present invention is intended to be included within the scope of the claims.

I claim:

1. A process for shrinking textile material inherently capable thereof made from a polymer obtained by polymerizing monomeric material comprising at least 80% acrylonitrile and up to 20% of ethylenically unsaturated monomer copolymerizable with the said acrylonitrile which comprises contacting the said material without dissolving it with a non-aqueous, non-ionic, neutral organic liquid at a temperature from about 60° C. to its boiling point until the textile materials shrink, the said non-aqueous liquid comprising (1) a compound in shrinking concentration selected from the group consisting of ethylene carbonate, trimethylene carbonate, and propylene carbonate, and (2) a glycol solvent for the carbonate compounds which is inert to the acrylonitrile polymer and in which the acrylonitrile polymer is insoluble.

2. The process of claim 1 in which the said solvent for the carbonate is selected from the group consisting of alkane diols and triols having up to 6 carbon atoms.

3. The process of claim 2 in which the solvent is ethylene glycol.

4. The process of claim 1 in which the carbonate is ethylene carbonate.

5. The process of claim 1 in which the said non-aqueous liquid contains up to about 40% by weight of said carbonate.

References Cited in the file of this patent

UNITED STATES PATENTS

| | | |
|---|---|---|
| 2,217,113 | Hardy | Oct. 8, 1940 |
| 2,249,756 | Finzel | July 22, 1941 |
| 2,716,586 | Terpay | Aug. 30, 1955 |
| 2,730,479 | Gibson | Jan. 10, 1956 |

FOREIGN PATENTS

| | | |
|---|---|---|
| 544,821 | Great Britain | Apr. 29, 1942 |
| 883,764 | France | Mar. 29, 1943 |
| 896,083 | France | Apr. 17, 1944 |

OTHER REFERENCES

Textile Research Jour., July 1954, pp. 597 and 603.